(12) United States Patent
Guthrie

(10) Patent No.: US 10,461,342 B2
(45) Date of Patent: *Oct. 29, 2019

(54) EXTERNAL MANIFOLD FOR MINIMIZING EXTERNAL LEAKAGE OF REACTANT FROM CELL STACK

(71) Applicant: Audi AG, Ingolstadt (DE)

(72) Inventor: Robin J. Guthrie, East Hartford, CT (US)

(73) Assignee: AUDI AG, Ingolstadt (DE)

( * ) Notice: Subject to any disclaimer, the term of this patent is extended or adjusted under 35 U.S.C. 154(b) by 128 days.

This patent is subject to a terminal disclaimer.

(21) Appl. No.: 15/292,653

(22) Filed: Oct. 13, 2016

(65) Prior Publication Data

US 2017/0033395 A1    Feb. 2, 2017

Related U.S. Application Data

(63) Continuation of application No. 14/284,315, filed on May 21, 2014, now Pat. No. 9,496,580, which is a continuation of application No. 12/998,475, filed as application No. PCT/US2008/013175 on Nov. 26, 2008, now Pat. No. 8,765,320.

(51) Int. Cl.
| | |
|---|---|
| *H01M 8/2484* | (2016.01) |
| *H01M 8/04029* | (2016.01) |
| *H01M 8/247* | (2016.01) |
| *H01M 8/2475* | (2016.01) |
| *H01M 8/248* | (2016.01) |
| *H01M 8/04007* | (2016.01) |

(Continued)

(52) U.S. Cl.
CPC ..... *H01M 8/04029* (2013.01); *H01M 8/04074* (2013.01); *H01M 8/1018* (2013.01); *H01M 8/247* (2013.01); *H01M 8/248* (2013.01); *H01M 8/2475* (2013.01); *H01M 8/2485* (2013.01); *H01M 2008/1095* (2013.01)

(58) Field of Classification Search
USPC ........................................................ 429/459
See application file for complete search history.

(56) References Cited

U.S. PATENT DOCUMENTS

| | | |
|---|---|---|
| 3,994,748 A | 11/1976 | Kunz et al. |
| 4,115,627 A | 9/1978 | Christner et al. |

(Continued)

FOREIGN PATENT DOCUMENTS

JP        7-263014 A    10/1995

*Primary Examiner* — Lucas J. O'Donnell
(74) *Attorney, Agent, or Firm* — Seed Intellectual Property Law Group LLP

(57) ABSTRACT

A fuel cell assembly has a plurality of fuel cell component elements extending between a pair of end plates to form a stack, and plural reactant gas manifolds mounted externally of and surrounding the stack, in mutual, close sealing relationship to prevent leakage of reactant gas in the manifolds to the environment external to the manifolds. The reactant gas manifolds are configured and positioned to maximize sealing contact with smooth surfaces of the stack and the manifolds. One embodiment is configured for an oxidant reactant manifold to overlie the region where the fuel reactant manifold engages the stack. Another embodiment further subdivides an oxidant reactant manifold to include a liquid flow channel, which liquid flow channel overlies the region where the fuel reactant manifold engages the stack.

19 Claims, 4 Drawing Sheets

(51) Int. Cl.
*H01M 8/1018* (2016.01)
*H01M 8/2485* (2016.01)

(56) References Cited

U.S. PATENT DOCUMENTS

| | | |
|---|---|---|
| 4,212,929 A | 7/1980 | Grevstad et al. |
| 4,345,009 A | 8/1982 | Fahle et al. |
| 4,467,018 A | 8/1984 | Schroll |
| 4,548,874 A | 10/1985 | Katz et al. |
| 6,024,848 A | 2/2000 | Dufner et al. |
| 6,531,237 B2 | 3/2003 | Kelley et al. |
| 6,660,422 B2 | 12/2003 | Krasij et al. |
| 6,764,787 B2 | 7/2004 | Grasso et al. |
| 7,413,822 B2 | 8/2008 | Hobmeyr et al. |
| 2002/0164514 A1 | 11/2002 | Kelley et al. |
| 2004/0048136 A1* | 3/2004 | Grasso ............... H01M 8/0271 429/460 |
| 2004/0258973 A1 | 12/2004 | Grasso et al. |
| 2005/0089736 A1 | 4/2005 | Meyers et al. |
| 2005/0221154 A1 | 10/2005 | Guthrie |

\* cited by examiner

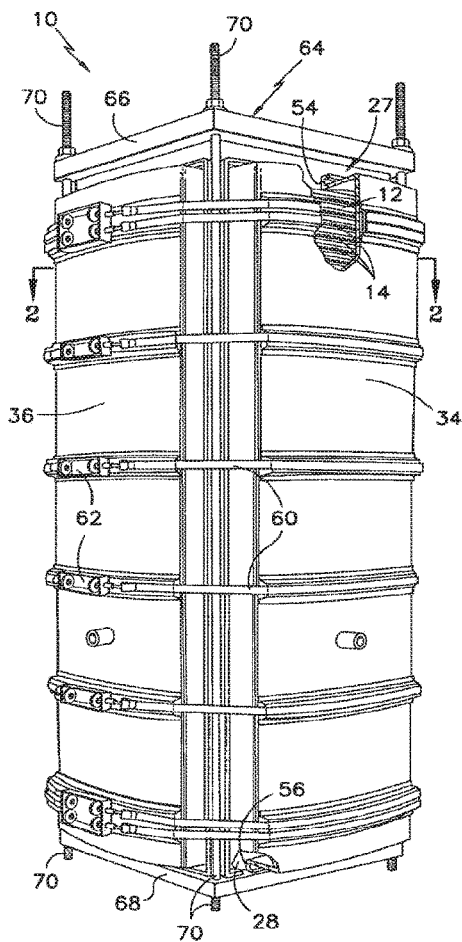
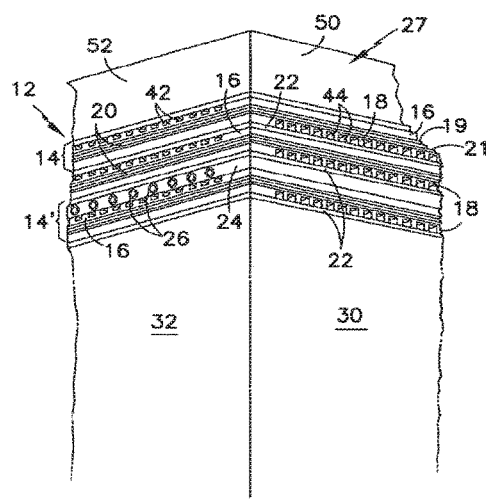
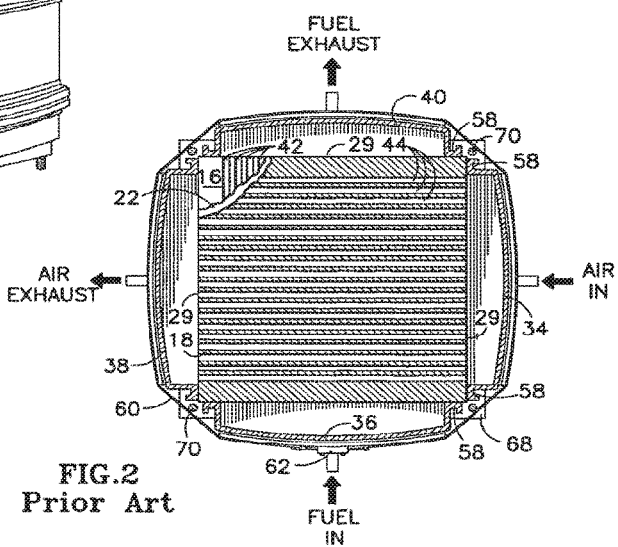
FIG.1 Prior Art
FIG.3 Prior Art
FIG.2 Prior Art

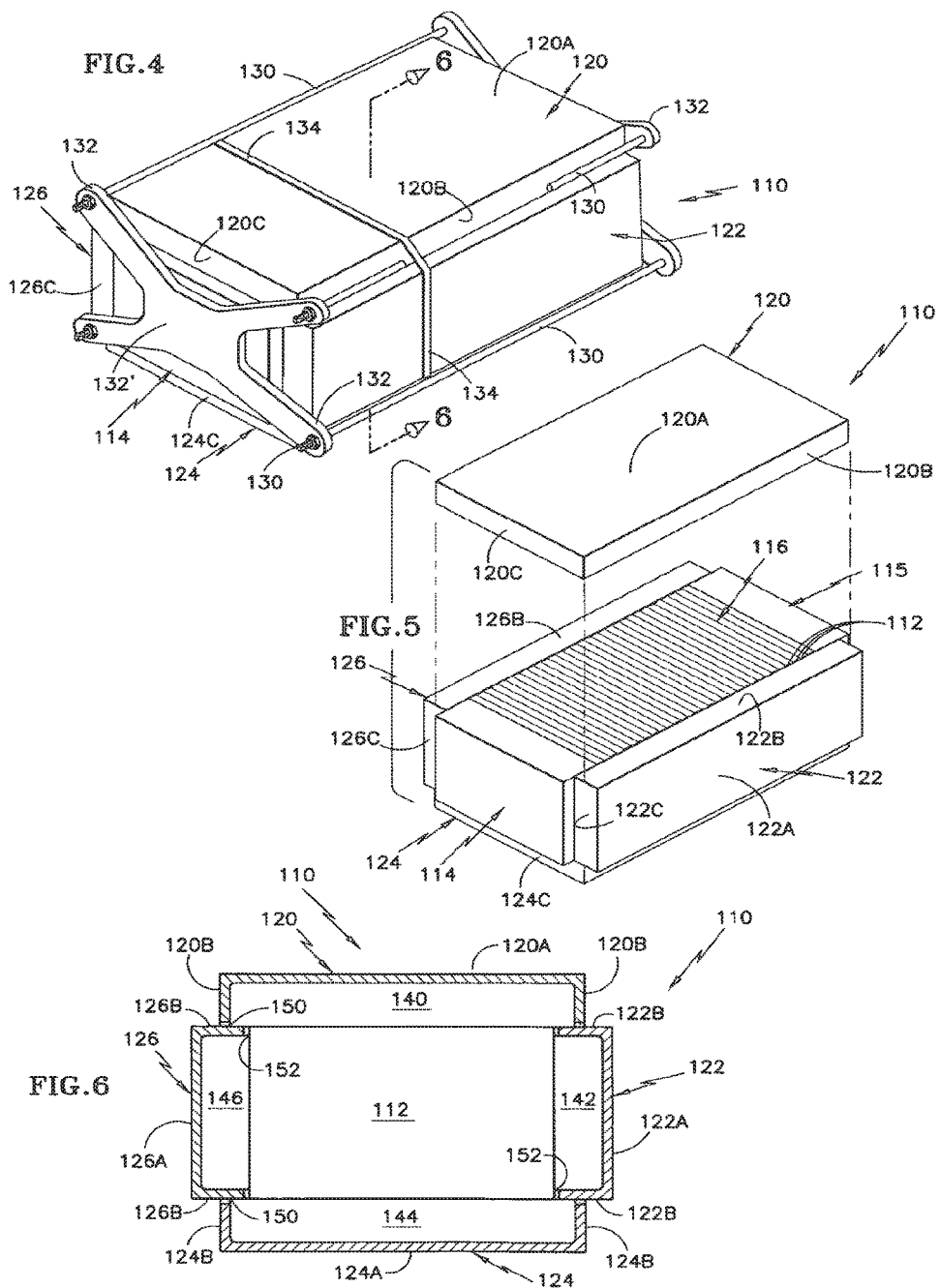

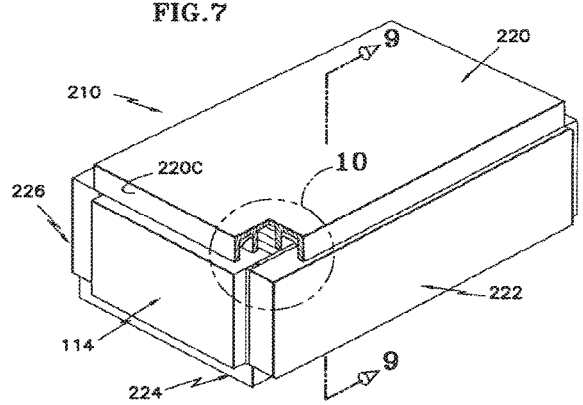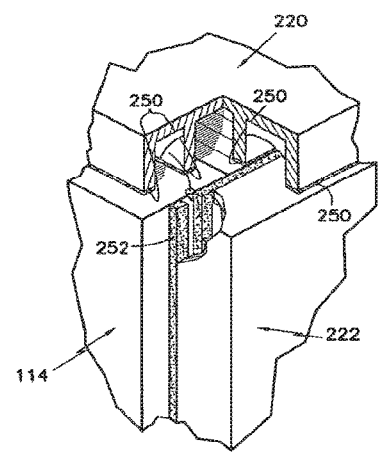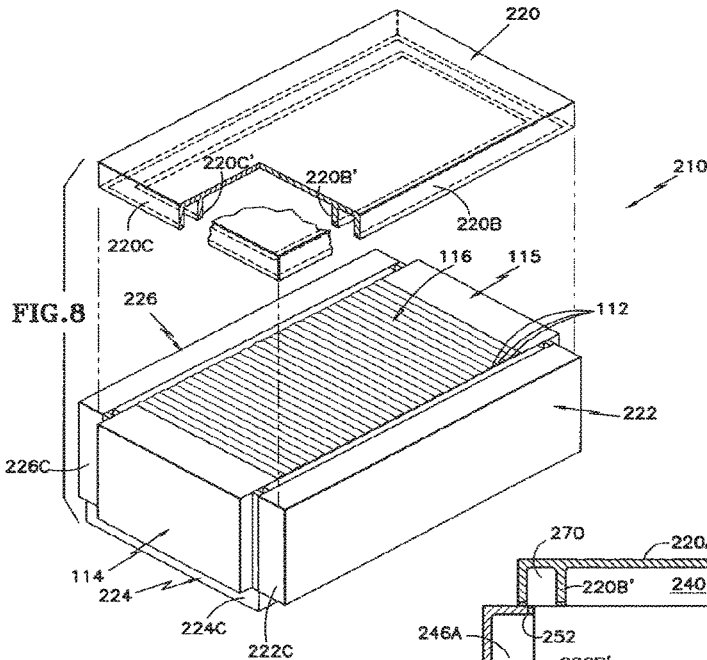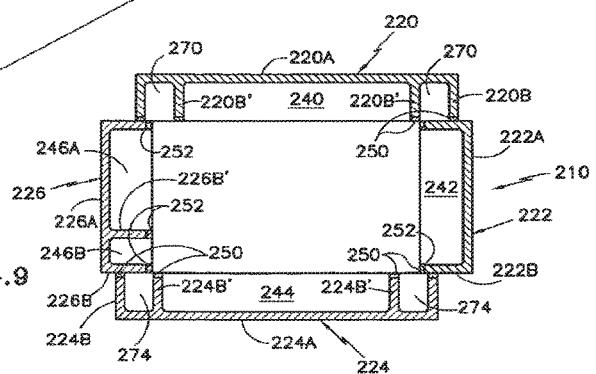

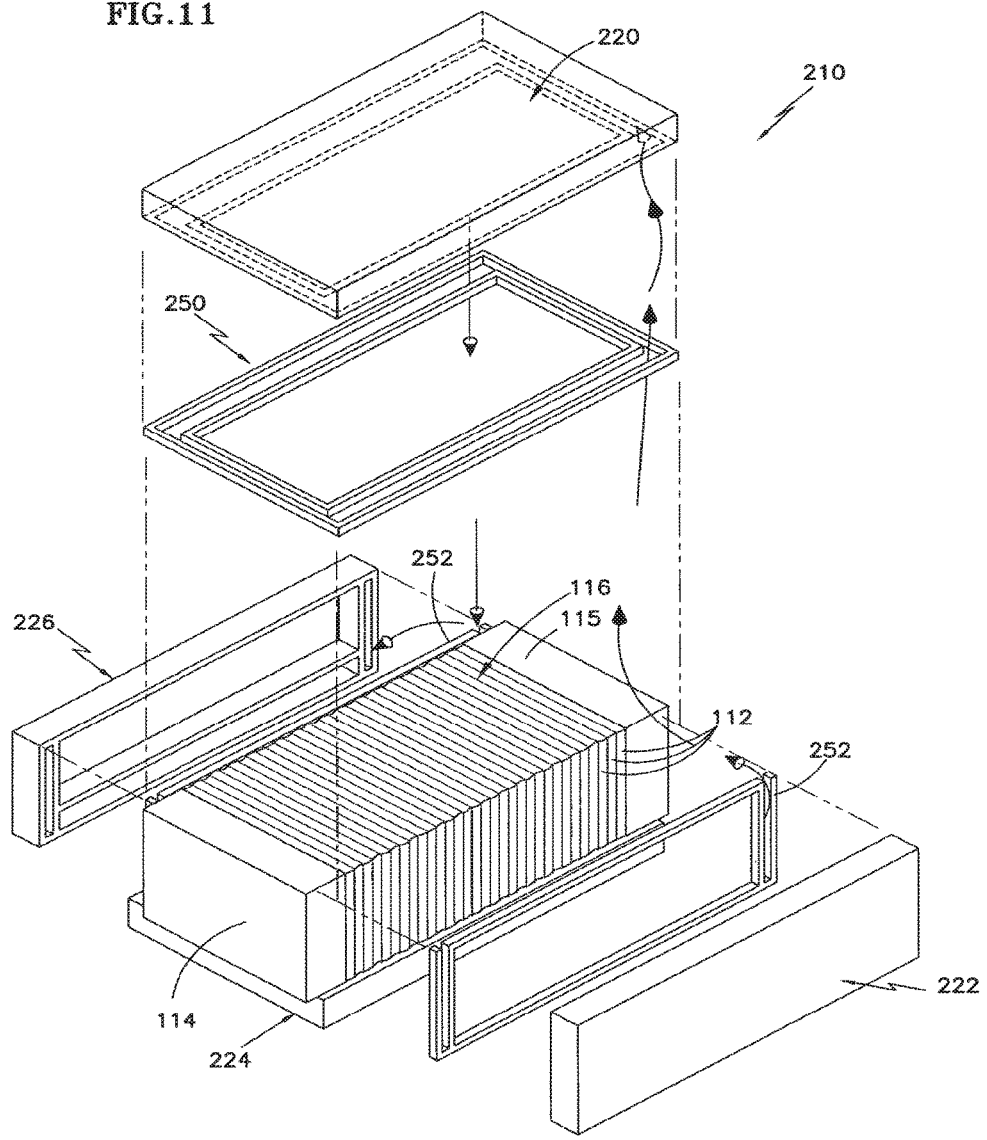

EXTERNAL MANIFOLD FOR MINIMIZING EXTERNAL LEAKAGE OF REACTANT FROM CELL STACK

CROSS REFERENCE TO RELATED APPLICATIONS

This application is a continuation of U.S. patent application Ser. No. 14/284,315, filed May 21, 2014, which is a continuation of U.S. patent application Ser. No. 12/998,475, filed Apr. 25, 2011, which is a national stage of PCT application no. PCT/US2008/013175, filed Nov. 26, 2008, each of which applications is hereby incorporated herein by reference in its entirety.

BACKGROUND

Technical Field

The disclosure relates generally to manifolds for stack assemblies, and more particularly to external manifolds for fuel cell stack assemblies. More particularly still, the disclosure relates to such external manifolds for fuel cell stack assemblies that may be located in leak-sensitive environments.

Description of the Related Art

In cell stack assemblies, it is known to use internal reactant and coolant manifolds as well as external reactant and coolant manifolds. Internal manifolds generally comprise passageways made within the various plates that constitute the cells of the cell stack assemblies. This renders the plates themselves more expensive than plates which are fabricated for use with external manifolds. Internal manifolds have potential leakage paths between the plates of every cell, the leakage thereby being "overboard" to the external environment. While external manifolds may also leak gasses to the external environment, the avoidance of such leaks is more easily accomplished. The operating location of the cell stack assemblies and associated manifolds is often determinative of the level of gas (typically reactant) leakage that can be tolerated to the environment. Indeed, in some instances, relatively greater leakage can be tolerated if the leakage region can be purged with air or the like. Typically, various closed spaces, as for example vehicular environments containing humans, are relatively more leak-sensitive, i.e., less leak-tolerant, and the ability to purge the leakage may be very limited or impractical.

External manifolds consist of manifold shells, manifold seal gaskets, and a mechanical loading or restraint system to hold the manifolds in compression, tightly against the edges of the cell stack.

A fuel cell module 10 of U.S. Pat. No. 4,345,009, shown in FIG. 1 and in cross section in FIG. 2, is one example of the external manifold and containment systems known in the art. The lower right corner of FIG. 2 is the corner of the module 10 pointing toward the viewer in FIG. 1. The module 10 includes a stack 12 of fuel cells 14. As shown in FIG. 3, each fuel cell 14 comprises a gas porous anode electrode 16 and a gas-porous cathode electrode 18 spaced apart with a layer 20, such as a liquid electrolyte-retaining matrix or a proton exchange membrane (PEM), disposed there between. Each electrode 16, 18 includes a very thin catalyst layer 19, 21, respectively on the surfaces thereof adjacent the layer 20. An electrically conductive, gas impervious plate 22 may separate adjacent fuel cells in the stack 12. Each fuel cell in the stack may include one separator plate 22 such that the phrase "fuel cell" will encompass a repeating unit of the stack which includes one separator plate. The fuel cells of this exemplary embodiment may be the same as shown in U.S. Pat. No. 4,115,627 in which the electrolyte is phosphoric acid. However, fuel cell stacks with proton exchange membrane electrolytes, as in U.S. Pat. No. 6,024,848, have similar needs with respect to manifolds and their integrity.

In this embodiment, every third fuel cell 14' (FIG. 3) includes a coolant carrying layer 24 disposed between the electrode 16 and the separator plate 22. Passing in-plane through this layer 24 are coolant carrying passages 26. The coolant flow through these passages carries away the heat generated by the fuel cells. The number of coolant layers 24 and passages 26 required by a stack is dictated by a variety of factors which are not relevant here. Although the coolant passages 26 are shown as extending to the surface 32 for clarity, in an actual fuel cell stack they would only do so in regions adjacent to two corners of the cell. The stack 14 is completed by top and bottom flat graphite current collector blocks 27, 28, respectively, bonded to the separator plates 22 at each end of the stack, and pressure plates 66, 68.

As shown in the drawing, the outer edges 29 of the stack components 16, 18, 20, 22, 24, 27 and 28 form four outwardly facing, approximately planar surfaces which are the external surfaces of the stack 12. Portions of two of these surfaces 30, 32 are shown in FIG. 3. Each of the four surfaces is substantially completely covered by a reactant gas manifold. An air or oxygen gas inlet manifold 34 covers the surface 30 while a fuel or hydrogen gas inlet manifold 36 covers the surface 32. The opposing surfaces are covered by an air outlet manifold 38 and a fuel outlet manifold 40 (FIG. 2).

The manifolding arrangement just described incorporates an outlet manifold on each side of the stack opposite an inlet manifold. However, as shown in in U.S. Pat. No. 3,994,748, a fuel manifold covering one surface of the stack may be divided into two compartments to serve as both the inlet and the outlet manifold, while the manifold on the opposite surface of the stack serves as a mixing manifold; the same configuration may be used for the air.

The anode electrode 16 and the cathode electrode 18 both comprise relatively thick substrates with ribs formed on one side thereof defining reactant gas channels 42, 44, respectively. The fuel gas channels 42 carry hydrogen or a hydrogen-rich gas across the cells from the fuel inlet manifold 36 to the fuel outlet manifold 40. The air channels 44 carry air across the cells from the air inlet manifold 34 to air outlet manifold 38. The flat surface of each substrate, which is opposite to the surface having the ribs (and thus the gas channels), has a layer 19, 21 of catalyst disposed thereon.

The graphite blocks 27, 28 have the same outer dimensions as the other stack components, and their outwardly facing surfaces (two of which, 50 and 52, can be seen in FIG. 3) provide smooth sealing surfaces for the top and bottom sealing flanges 54, 56 of each manifold. A thick block at one end of the stack is required to accommodate the possible differences in stack height (or length, depending on stack orientation) which could result from the buildup of the very small tolerances in the thickness of the many hundreds of components in the stack 12. For example, a stack of 400 cells each having a thickness of about 0.64 cm (0.25 inch) with a tolerance of 0.01 cm (±0.004 inch) could have an overall height of anywhere from 250 to 258 cm (98.4 to 101.6 inches). The manifolds, on the other hand, have a fixed height (length) A large block thickness is thus required to ensure that both the top and bottom flanges 54, 56 are located somewhere on the smooth sealing surfaces of the blocks 27, 28 after the desired compressive force has been applied to the stack, as hereinafter explained.

As best shown in FIG. 2, side flanges 58 seal against the vertically extending external surfaces of the stack 12 near the corners of the stack which do not have reactant gas channels. A sealing material, such as a porous polytetrafluoroethylene, is disposed between the manifold flanges 54, 58 and the surfaces of the stack. Steel bands 60 (FIGS. 1 and 2) surround the stack manifolds, and hold them in sealing relationship with the stack and graphite blocks. Fasteners 62 connecting the ends of each band permit tightening the bands to the extent necessary to ensure adequate sealing.

To obtain good electrical, thermal, and sealing contact between the various components of the fuel cells and the stack 12, the module 10 includes a constraint system 64. In this exemplary embodiment, the constraint system 64 comprises inflexible top and bottom steel end or pressure plates 66, 68, respectively, and tie rods 70 connecting the plates. The plates 66, 68 rest flat against the graphite blocks 27, 28, respectively. In assembling a module 10, the pressure plates 66, 68, the blocks 48, 49, and the various stack components are arranged one atop (or adjacent, depending on orientation) the other in proper sequence. This assembly is hydraulically loaded whereupon a preselected axial (i.e., perpendicular to the plane of the cells) load is applied to the plates 66, 68 to compress the stack 12. The tie bolts 70 are then tightened down to an extent that, when the assembly is removed from the press, the compressive force on the stack 12 is of approximately the desired magnitude. The manifolds 34, 36, 38, and 40 are then positioned against the sides of the stack and secured by the bands 60.

Since the constraint system 64 and the manifolds 34, 36, 38, and 40 are made from similar materials (carbon steel), they have the same or approximately the same coefficient of thermal expansion. Therefore, when the stacks heat up during operation, these items expand to approximately the same extent. Although the stack 12 has a lower coefficient of thermal expansion, as the plates 66, 68 move apart the elasticity or spring rate of the compressed stack 12 results in the height of the stack 12 increasing by the same rate with an accompanying loss in axial load. Thus, there is virtually no relative movement between the graphite blocks 27, 28 and their respective manifold sealing flanges 54, 56 during thermal expansion. Likewise, there is relatively little motion between the stack external surfaces, such as 30 and 32, and the vertical manifold sealing flanges 58. Once steady state is reached the constraint system 64 holds the stack height constant.

The external manifold system described with respect to FIGS. 1-3 presents difficulty in assuring the avoidance of leakage overboard to the external environment. Although the four outwardly facing surfaces formed by the sides of the assembled stack components 16, 18, 20, 22, 24, 27 and 28 of that U.S. Pat. No. 6,764,787 were characterized above as being "approximately planar", in fact they are typically somewhat irregular due to minor inconsistencies in the sizes and/or alignments of those assembled stack components. This may be better understood with reference to U.S. Pat. No. 6,660,422, which describes and depicts the irregularity of such surfaces. These irregularities in those outwardly facing surfaces of the stack further complicate efforts to obtain a good seal between the manifolds and at least those surfaces of the stack. The possible leakage of fuels, such as hydrogen, in prior art fuel cell assembly designs may be particularly undesirable in closed spaces, as for example in human-occupied vehicles and the like, where the elimination or dilution of such leaked fuel is not possible or is inadequate.

However, the use of external manifolds may be advantageous for various reasons. External manifolds can be lower in product cost to manufacture, and provide a protective shield around the fuel cells top protect them from physical damage and contamination. External manifolds can also provide an electrical short protection when combined with dielectric seal materials, plastic coated metals, and/or made from plastic materials. They can provide structural support for the cell stack. External manifolds can also provide the flexibility of integrating reactant flow and coolant distribution features, such as baffles and/or chambers to allow the fuel cell stack to operate with better reactant and coolant usage and to make the fuel cell stack more durable.

BRIEF SUMMARY

A fuel cell assembly has a plurality of fuel cell component elements extending under compressive pressure between a pair of end plates to form a stack, and plural reactant gas manifolds mounted externally of and surrounding the stack, in mutual, close sealing relationship to prevent leakage of reactant gas in the manifolds to the environment external to the manifolds, i.e., overboard. The fuel cell stack may include, for example, a plurality of polymer electrolyte membrane (PEM) fuel cells. The reactant gas manifolds are configured and positioned to maximize sealing contact with smooth surfaces of the stack and the manifolds. At least some of the plural reactant gas manifolds include smooth surfaces in close sealing engagement with smooth surfaces of others of the plural reactant gas manifolds. The end plates also have smooth peripheral surfaces for close sealing engagement with the reactant gas manifolds. As used herein, the phrase "smooth surface" or "smooth face" as applied to various surfaces, typically means that the particular surface has a surface roughness of less than about 128 micro inch (or less than approximately 3 microns).

One example embodiment includes a pair of opposed fuel reactant manifolds on opposite sides of the stack, and a pair of opposed oxidant reactant manifolds on further opposite sides of the stack in orthogonal relation with the fuel reactant manifolds. The reactant manifolds are provided with inwardly-facing sealing surfaces, or flanges, which are smoothly contoured for good sealing engagement with a smooth surface, and may include similarly smoothly contoured external surfaces for mated sealing engagement with the inwardly-facing sealing surfaces of other manifolds. The reactant manifolds are typically rectilinear, and the inwardly-facing sealing surfaces at opposite ends of the manifolds are in mated sealed engagement with the smooth peripheral surfaces of the end plates. The inwardly-facing sealing surfaces of the oxidant reactant manifolds and the fuel reactant manifolds are typically coextensive with one another with respect to the (axial) length of the stack. However, whereas the inwardly-facing sealing surfaces of the fuel reactant manifold that extend transversely of the stack are coextensive with the corresponding transverse dimension of the end plate, the inwardly-facing sealing surfaces of the oxidant reactant manifold that extend transversely of the stack extend beyond the corresponding transverse dimension of the end plate and overlap a smooth external surface of the fuel reactant manifolds for good sealing engagement therewith. This assures that any leakage from the fuel reactant manifold in regions of irregular mating surfaces will find its way to the oxidant reactant manifold, where the inwardly-facing sealing surfaces are in engagement only and entirely with mating smooth sealing surfaces.

Another example embodiment, similar to that described above, additionally includes channels for another fluid, typically the coolant liquid, within at least a peripheral region of a reactant manifold. The liquid is typically a coolant such as water, and the positioning of the liquid channels is such that gaseous reactant leakage, particularly of fuel, but also oxidant, will find its way to the liquid for safe containment and/or removal. The liquid channels are typically in the oxidant reactant manifold and are positioned to overlie at least the region along which the fuel reactant manifold engages the fuel cell stack. Gasketing that typically exists between the mating sealing surfaces of the manifolds and the end plates and/or manifold exteriors may be structured to facilitate flow of coolant in the peripheral regions, or channels, outwardly of the oxidant and fuel reactant flow channels. Moreover, the relative operating pressures of the fuel reactant, the oxidant reactant, and the coolant may be selected such that the fuel reactant pressure is greatest and the coolant pressure least so that any reactant leakage is toward and into, the coolant.

BRIEF DESCRIPTION OF THE SEVERAL VIEWS OF THE DRAWINGS

FIG. 1 is a perspective view, partly broken away, showing a fuel system of the prior art.

FIG. 2 is a sectional view taken along line 2-2 in FIG. 1. The section is taken parallel to the plane of the cells, cutting through the reactant gas channels of a cathode electrode.

FIG. 3 is a perspective view of a portion of the stack of fuel cells of FIG. 1 with the manifolds and constraint system of FIG. 1 removed.

FIG. 4 is a simplified, stylized schematic perspective view of an embodiment of the external manifold system of the disclosure, disposed about a cell stack.

FIG. 5 is a partly exploded view of the external manifold system of FIG. 4.

FIG. 6 is a sectional view taken along line 6-6 of FIG. 4.

FIG. 7 is a simplified, stylized schematic perspective view, partly broken away, of another embodiment of the external manifold system of the disclosure, disposed about a cell stack and providing a coolant channel.

FIG. 8 is a partly exploded view of the external manifold system of FIG. 7.

FIG. 9 is a sectional view taken along line 9-9 of FIG. 4.

FIG. 10 is an enlarged view of the coolant channel(s) shown encircled by broken line 10 in FIG. 7.

FIG. 11 is an exploded view of the external manifold system of FIG. 7, further depicting gaskets and fluid flow paths.

DETAILED DESCRIPTION

The prior art fuel cell module of FIGS. 1-3 was depicted in a form generally representative of one having a liquid electrolyte, such as phosphoric acid, and was depicted in a vertical orientation and having the graphite current collector blocks and the end plates as separate members. While the aspects of the embodiments to be disclosed hereinafter are similarly applicable to a configuration as discussed in the preceding sentence, the example embodiments hereinafter described are presented in the context of a PEM fuel cell module, typically oriented horizontally and having the collector block and end plate at an end of the stack formed as a unitary member.

Referring to FIGS. 4 through 6, there is depicted, in simplified, stylized, perspective fashion, a fuel cell assembly 110 having a plurality of fuel cell component elements 112 extending under compressive pressure between a pair of end plates 114, 115 to form a fuel cell stack 116. The fuel cell stack 116 illustrated is of the PEM type, though other electrolyte configurations may be used as well. The fuel cell assembly 110 also includes external reactant manifolds 120, 122, 124 and 126. In the illustrated embodiment, top and bottom reactant manifolds 120, 124 provide for the inlet and outlet, respectively, of oxidant reactant, such as air or $O_2$ to the fuel cell stack 116, and the opposite side reactant manifolds 122, 126 provide for inlet and outlet, respectively, of fuel reactant, such as $H_2$ or a $H_2$-rich gas, to the fuel cell stack 116.

The fuel cell stack 116, the end plates 114, 115, and the reactant manifolds 120, 122, 124, and 126 are maintained in compressive engagement, both axially and circumferentially. As noted earlier, in this embodiment the end plates 114, 115 each combine the end plate and the collector block of the described prior art into a unitary, or integral, structure. The stack 116 with end plates 114, 115 is held in compressive axial engagement by suitable means, such as tie rods 130 that extend between mounting flanges 132 at opposite ends of the assembly. The mounting flanges 132 may be formed as integral "ears" extending from corners of the end plates 114, 115, or they may be part of a separate "X-shaped" cross member 132' as shown herein. The tie rods 130 include threaded ends and have retaining nuts, or any other suitable fastening arrangement. The fuel cell stack 116 and the surrounding reactant manifolds 120, 122, 124, and 126 are retained circumferentially in compressive engagement by, for example, stainless steel compression bands 134, only one being partly shown in FIG. 4.

Referring to the disclosed external manifold arrangement in greater detail, each of the reactant manifolds 120, 122, 124, and 126 is typically rectilinear in shape and covers the entirety of a side of at least the fuel cell component elements 112 of the fuel cell stack 116. The reactant manifolds 120, 122, 124, and 126 each include a respective cover wall member 120A, 122A, 124A and 126A having an outwardly facing, smooth planar surface, and respective side flanges 120B, 122B, 124B, and 126B and end flanges 120C, 122C, 124C, and 126C continuously connected and extending inwardly toward the fuel cell stack 116 to define respective manifold chambers 140, 142, 144, and 146. The side and end flanges 120B, 122B, 124B, and 126B and 120C, 122C, 124C, and 126C are typically orthogonal to the respective cover wall members 120A, 122A, 124A and 126A, and include smooth end faces for good sealing engagement. Those smooth end faces are not separately numbered in the Figures, but are at the distal ends of the respective side and end flanges with which they are associated. As used herein, the phrase "smooth surface" or "smooth face" as applied to the end faces of the manifold side and end flanges, and to the manifold cover walls and the side perimeter surfaces of the end plates, typically means that the particular surface has a surface roughness of less than about 128 micro inch (or less than approximately 3 microns).

The manifold chambers 140 and 144 respectively supply oxidant reactant to, and remove oxidant reactant from, the fuel cell stack 116. Similarly, the manifold chambers 142 and 146 respectively supply fuel reactant to, and remove fuel reactant from, the fuel cell stack 116. The length of the fuel reactant manifolds 122 and 126 is such that the respective end flanges 122C and 126C may be, and are, positioned in engagement with the respective and plates 114, 115. Correspondingly, the width (in this depiction, height) of the fuel reactant manifolds 122 and 126 is such that the respective side flanges 122B and 126B may be, and are, substantially flush, or even, with that same dimension of the end plates 114, 115 and the fuel cell stack 116, which are substantially equal. This is seen most clearly in FIG. 6.

The length of the oxidant reactant manifolds 120 and 124 is such that, like manifolds 122 and 126, the respective end flanges 120C and 122C may be, and are, positioned in engagement with the respective and plates 114, 115. However, in accordance with the disclosure, the width of the oxidant reactant manifolds 120 and 124 is such that the respective side flanges 120B and 124B are outboard of that dimension of the end plates 114, 115 and the fuel cell stack 116, and are aligned in substantially perpendicular, butting engagement, perhaps via a thin gasket, with the smooth external surfaces of flanges 122B and 126B of the manifolds 122 and 126 to provide a good seal. This also is seen most clearly in FIG. 6.

The ends of the various flanges 120B, 120C, 122B, 122C, 124B, 124C, 126B, and 126C are each formed and/or machined to be smooth and linear to provide close sealing engagement with the similarly smooth surfaces of the end plates 114, 115 and the manifold flanges 122B, 122C, 126B, and 126C. It should be noted that as used herein with reference to the sealing engagements described above, the phrase "sealing engagement" is meant to include not only direct contact between the abovementioned metal, graphite, and plastic elements, but to also include the provision of a thin sealing agent or gasket between those members as well. In the example described, thin gaskets 150 are positioned at the end faces of the flanges of the oxidant reactant manifolds 120 and 124, and similar thin gaskets 152 are positioned at the end faces of the flanges of the fuel reactant manifolds 122, 126, as seen in FIG. 6. The gaskets 150, 152 are generally shaped to conform to the perimeters of the manifolds 120, 122, 124, 126, as represented by the end faces of their respective flanges. The gaskets 150 and 152 are formed of a material suitably resilient for sealing purposes and resistant to the fluids in that environment. The gaskets are typically solid or foam elastomer-type materials, of flat or shaped profile. The gaskets are normally either adhesively attached to the stack and/or manifold, or they are retained in a groove of appropriate geometry. The gaskets can also be single or multiple "formed in place" layers of cured-in-place elastomer materials as well, or a combination of those previously mentioned techniques. One example of a cured-in-place elastomer is silicone RTV rubber sealants.

Because the width (in this depiction, height) of the fuel reactant manifolds 122, 126 is such that the respective side flanges 122B and 126B may be, and are, substantially flush, or even, with that same dimension of the end plates 114, 115 and the fuel cell stack 116, the ends of those flanges may abut a somewhat irregular surface along the fuel cell stack because of slightly varying dimensions and thermal expansion of the individual fuel cell component elements 112 (as described and depicted in the aforementioned U.S. Pat. No. 6,660,422). While the gaskets 152 aid in filling and sealing any voids between these abutting surfaces, experience has shown the seal to be less than complete. However, because the width of the oxidant reactant manifolds 120 and 124 is such that the respective side flanges 120B and 124B are outboard of that dimension of the end plates 114, 115 and the fuel cell stack 116, and are aligned in substantially perpendicular, butting engagement with the smooth surfaces of flanges 122B and 126B of the manifolds 122 and 126, there is a greatly diminished requirement for the gaskets 150 to be of complex form in order to provide a good seal. Moreover, because the width of the oxidant reactant manifolds 120 and 124 places side flanges 120B and 124B outboard of the locations where the fuel reactant manifold side flanges 122B and 126B abut the fuel cell stack 116, any fuel leakage occurring at those latter junctures is scavenged by, or delivered into, the oxidant reactant in manifolds 120 and 124, without undesired leakage overboard to the local environment external to the fuel cell assembly 110.

Reference is now made to an embodiment of a fuel cell assembly 210 depicted in FIGS. 7-11 in which there exists strong similarities to the fuel cell assembly 110 of the FIG. 4-6 embodiment. For the sake of brevity, elements for the axial and circumferential compression and retention of the fuel cell assembly 210 are present but not shown. Further, elements of this embodiment which are the same as those in the FIG. 4-6 embodiment have been given similar numbers, such as the fuel cell component elements 112 forming the fuel cell stack 116, and the end plates 114 and 115. The elements of this embodiment which are broadly analogous to, but differ somewhat from, the FIG. 4-6 embodiment, are given similar "suffix" numbers in the "200" series, and the several components which are newly identified are given new "suffix" numbers in the "200" series.

While the FIG. 7-11 embodiment includes the broader external seal aspects of the FIG. 4-6 embodiment, it further includes provision for one or more liquid flow channels, typically for coolant such as water, positioned in the external manifolds to further contain any reactant leakage that might occur. The presence of liquid in the liquid flow channel(s) may serve to supply and circulate coolant not only for conventional purposes, but also to scavenge or collect any reactant gas that may leak from the reactant manifold compartments or cell element corners. The liquid flow channel(s) in the external manifolds is/are positioned to overlie and/or directly communicate with most, or all, of the regions where the reactant manifolds are in engagement with the fuel cell stack 116 and might be otherwise subject to reactant leakage externally to the stack.

Referring to FIGS. 7-11 in greater detail, the fuel cell stack 116 is bounded on each end by end plates 114, 115, and along the respective sides by external manifolds 220, 222, 224, and 226. The reactant manifolds 220, 222, 224, and 226 each include a respective cover wall member 220A, 222A, 224A and 226A having an outwardly facing planar surface, and respective outboard side flanges 220B, 222B, 224B, and 226B and outboard end flanges 220C, 222C, 224C, and 226C continuously connected and extending inwardly toward the fuel cell stack 116 to define associated manifold chambers to be described. Additionally, the reactant manifolds 220 and 224 include further inboard side flanges 220B' and 224B' spaced inward of the respective outboard side flanges 220 B and 224B, and further inboard end flanges 220C' and 224C' (not separately visible) spaced inward of the respective outboard end flanges 220C and 224C, with the respective inboard side and end flanges being joined and continuous to define new chambers. Further still, the reactant manifold 226 may include an inboard side flange 226B' located inward of the outward side flange 226B to subdivide a chamber. The various side flanges 220B, 220B', 222B, 224B, 224B', 226B and 226B' and various end flanges 220C, 220C', 222C, 224C, 224C', and 226C are typically orthogonal to the respective cover wall members 220A, 222A, 224A, and 226A, and include smooth end faces for good sealing engagement.

The side manifolds 222 and 226 comprise, respectively, manifold chambers 242, and 246A and 246B respectively. As depicted herein, the manifold chamber 246A is for the entry of fuel reactant to the fuel cell stack 116, the manifold chamber 242 is for reversing the direction of the fuel reactant at the opposite side of the stack, and the manifold chamber 246B is for the discharge of fuel reactant from the stack. The inboard side flange 226B' serves to subdivide manifold 226 into the chambers 246A and 246B. The remaining, or top and bottom, manifolds 220 and 224 comprise, respectively, manifold chambers 240 and 270, and 244 and 274 respectively, with manifold chambers 270 and 274 being laterally outward of manifold chambers 240 and 270 respectively. The inboard side flanges 220B' and 224B', and the corresponding inboard end flanges 220C' and 224C' joined therewith, serve to subdivide the corresponding manifolds 220 and 224 into the respective manifold chambers 240, 270, and 244, 274. The manifold chambers 240 and 244 serve to contain and direct the entry and exhaust of oxidant reactant to and from the fuel cell stack 116, generally as described with respect to the FIG. 4-6 embodiment. Typically oxidant will enter at manifold 220 and exhaust at manifold 224, and coolant entry and exhaust will be the reverse of that, but that arrangement may be reversed. The manifold chambers 270 and 274 are added in the present embodiment and comprise the liquid flow channels in which a liquid, such as coolant water or the like, is contained and flows. The lateral, our outward, positioning of those manifold chambers 270 and 274 in the manifolds 220 and 224 of which they are a part, is such that those manifold chambers overlie the regions along which the fuel reactant manifolds 222, 226 engage the fuel cell stack 116, which regions might give rise to possible leakage of fuel reactant. In this way, the manifold chambers 270 and 274 which form the liquid flow channels are capable of receiving, or intercepting, any such leakage of fuel reactant.

As with the previous embodiment, the FIG. 7-11 embodiment includes thin gaskets 250 positioned at the end faces of the flanges of the oxidant reactant/coolant manifolds 220 and 224, and similar thin gaskets 252 are positioned at the end faces of the flanges of the fuel reactant manifolds 222 and 126, as seen in FIGS. 9-11. The gaskets 250, 252 are generally shaped to conform to the perimeters of the manifolds 220, 222, 224, 226, as represented by the end faces of their respective flanges. More specifically, the gaskets 250, 252 are generally structured and configured to provide gasket material between the end faces of the various manifold flanges and the surfaces which thy engage to provide the desired seal. Because there are now inboard flanges such as 220B' and 224B' and 220C' and 224C' which are spaced from the respective outboard flanges to define the liquid channels 270 and 274, it is appropriate and desirable that the gasket material generally be absent in/from the space and region between the flanges which define the liquid channels 270 and 274. Moreover, this spacing between adjacent arms or runs of the gasket material in this area should be great enough, e.g., 0.6 mm, to allow flow of a gas relative to the liquid through which it may flow, without undue resistance by surface tension. In this way, liquid coolant may easily circulate into and out of the fuel cell stack 116 via the liquid channels 270, 274, and any leakage of fuel reactant or even oxidant reactant, beyond the respective seals will readily find its way into the liquid in the liquid channels 270, 274. Thus, the geometry of the gaskets 250 and 252 is selected to provide integral structures where possible, yet to also contain flow passages that facilitate and/or control the flow of fluids in the channels or manifold chambers to which they are adjacent. The gaskets 250 and 252 are formed of a material suitably resilient for sealing purposes and resistant to the fluids in that environment and may be, conveniently, a foam rubber or the like.

Referring further to FIGS. 7-11 and particularly to the exploded view of the fuel cell assembly 210 in FIG. 11, there is depicted the external manifolds and associated gasketing to provide a disclosed arrangement for minimizing or preventing leakage of reactant, and particularly fuel reactant, to the environment external to the fuel cell assembly. As noted, the various manifolds 220, 222, 224, and 226 are formed and configured to provide smooth mating surfaces for good sealing, as well as to provide and position liquid flow channels 270, 274 in the manifolds in a manner that facilitates collection of any reactant gas leakage into the contained liquid/coolant and prevents its unwanted release to the environment. Flow arrows in FIG. 11 are intended to very generally show one possible path of a liquid, such as coolant water, in the region of the fuel cell stack 116 serving to entrain and/or scavenge any reactant gas that might leak from the respective reactant manifold chambers 240, 242, 244, 246A, and/or 246B. One possible configuration of the gaskets 250 and 252 is illustrated in greater detail in FIG. 11. Although not depicted herein, it will be understood that the liquid in flow channels 270 and 274 is admitted to and exhausted from the fuel cell assembly 210 in a conventional manner and may be directed through an external accumulator/scrubber to remove any entrained reactant gasses in an acceptable known manner. Further, the fuel reactant, the oxidant reactant, and the liquid coolant within the system are each supplied to and removed from the fuel cell stack 116 via the respective manifolds as described above, and their respective pressures are regulated in a known manner (not shown in detail) such that the fuel reactant pressure is relatively the greatest and the coolant pressure is relatively the least, such that any reactant leakage is toward, and into, the coolant.

Although the disclosure has been described and illustrated with respect to the exemplary embodiments thereof, it should be understood by those skilled in the art that the foregoing and various other changes, omissions and additions may be made without departing from the spirit and scope of the disclosure.

What is claimed is:

1. A fuel cell assembly, comprising:
   a stack of fuel cell component elements, the stack having a first end, a second end opposite to the first end, a first side extending from the first end to the second end, a second side extending from the first end to the second end, a third side extending from the first end to the second end, and a fourth side extending from the first end to the second end;
   a first oxidant manifold coupled to the first side of the stack of fuel cell component elements, the first oxidant manifold including a first inboard side flange and a second inboard side flange that divide the first oxidant manifold between a first oxidant chamber, a first coolant chamber, and a second coolant chamber;
   a second oxidant manifold coupled to the second side of the stack of fuel cell component elements;
   a first fuel manifold coupled to the third side of the stack of fuel cell component elements; and
   a second fuel manifold coupled to the fourth side of the stack of fuel cell component elements,
   wherein ends of the first oxidant manifold overlap a first side of the first fuel manifold and a first side of the second fuel manifold, and
   wherein the first and second oxidant manifolds and the first and second fuel manifolds are arranged to prevent leakage of fuel and oxidant from the stack and the manifolds to an external environment.

2. The fuel cell assembly of claim 1 wherein the first oxidant chamber is between the first coolant chamber and the second coolant chamber.

3. The fuel cell assembly of claim 1 wherein the first coolant chamber and the second coolant chamber are laterally outward of the first oxidant chamber.

4. The fuel cell assembly of claim 1 wherein a first gasket separates the first side of the first fuel manifold from a first one of the ends of the first oxidant manifold and a second gasket separates the first side of the second fuel manifold from a second one of the ends of the first oxidant manifold.

5. The fuel cell assembly of claim 1 wherein ends of the second oxidant manifold overlap a second side of the first fuel manifold and a second side of the second fuel manifold, the second oxidant manifold including a third inboard side flange and a fourth inboard side flange that divide the second oxidant manifold between a second oxidant chamber, a third coolant chamber, and a fourth coolant chamber.

6. The fuel cell assembly of claim 5 wherein a first gasket separates the second side of the first fuel manifold from a first one of the ends of the second oxidant manifold and a second gasket separates the second side of the second fuel manifold from a second one of the ends of the second oxidant manifold.

7. The fuel cell assembly of claim 1 wherein the first side of the stack has a first width and a distance between a first one of the ends of the first oxidant manifold and a second one of the ends of the first oxidant manifold is greater than the first width.

8. The fuel cell assembly of claim 7 wherein the second side of the stack has a second width and a distance between a first one of the ends of the second oxidant manifold and a second one of the ends of the second oxidant manifold is greater than the second width.

9. A fuel cell device, comprising:
a stack of fuel cell component elements having a first end, a second end opposite to the first end, a first side, a second side opposite to the first side, a third side, and a fourth side opposite to the third side;
a first fuel manifold coupled to the third side of the stack of fuel cell component elements;
a second fuel manifold coupled to the fourth side of the stack of fuel cell component elements;
a first oxidant manifold coupled to the first fuel manifold and the second fuel manifold, the first oxidant manifold including a first flange and a second flange that divide the first oxidant manifold into a first oxidant chamber, a first coolant chamber, and a second coolant chamber; and
a second oxidant manifold coupled to the first fuel manifold and the second fuel manifold.

10. The device of claim 9 wherein the first oxidant chamber is between the first coolant chamber and the second coolant chamber.

11. The device of claim 9 wherein the first coolant chamber and the second coolant chamber are laterally outward of the first oxidant chamber.

12. The device of claim 9 wherein the first oxidant manifold overlaps the first fuel manifold and the second fuel manifold and the second oxidant manifold overlaps the first fuel manifold and the second fuel manifold.

13. The device of claim 9 wherein each of the first and second oxidant manifolds and the first and second fuel manifolds is a rectangular box with a main side having four smaller sides extending from the main side.

14. The device of claim 13 wherein an edge of each of the four sides of each of the first and second oxidant manifolds is in contact with one of the four sides of the first fuel manifold and with one of the four sides of the second fuel manifold.

15. The device of claim 9 wherein the second oxidant manifold includes a third flange and a fourth flange that divide the second oxidant manifold into a second oxidant chamber, a third coolant chamber, and a fourth coolant chamber.

16. A device, comprising:
a fuel cell stack;
a first manifold adjacent to a first side of the fuel cell stack;
a second manifold adjacent to a second side of the fuel cell stack;
a third manifold adjacent to a third side of the fuel cell stack; and
a fourth manifold adjacent to a fourth side of the fuel cell stack;
wherein the first and second manifolds are positioned on opposing sides of the fuel cell stack, the third manifold is positioned on sides of the first and second manifolds, the fourth manifold is positioned on sides of the first and second manifolds, and the third manifold includes a first internal flange and a second internal flange that divide the third manifold into a first oxidant chamber, a first coolant chamber, and a second coolant chamber.

17. The device of claim 16 wherein the fourth manifold includes a third internal flange and a fourth internal flange that divide the fourth manifold into a second oxidant chamber, a third coolant chamber, and a fourth coolant chamber.

18. The device of claim 16 wherein the first oxidant chamber is between the first coolant chamber and the second coolant chamber.

19. The device of claim 16 wherein the first coolant chamber and the second coolant chamber are laterally outward of the first oxidant chamber.

* * * * *